United States Patent
Yasuhara et al.

(10) Patent No.: US 6,863,332 B2
(45) Date of Patent: Mar. 8, 2005

(54) AUTOMOBILE SUN VISOR

(75) Inventors: Fumitoshi Yasuhara, Saitama (JP); Fumiharu Ochiai, Saitama (JP); Koji Ikeda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/650,034

(22) Filed: Aug. 28, 2003

(65) Prior Publication Data

US 2004/0090080 A1 May 13, 2004

(30) Foreign Application Priority Data

Sep. 5, 2002 (JP) ........................................ 2002-260037

(51) Int. Cl.[7] .............................................. B60J 3/00
(52) U.S. Cl. ...................................................... 296/97.9
(58) Field of Search ............................ 296/97.7, 97.9, 296/97.12

(56) References Cited

U.S. PATENT DOCUMENTS

| | | | | |
|---|---|---|---|---|
| 4,394,043 A | * | 7/1983 | Moulding et al. | 296/97.9 |
| 4,500,131 A | * | 2/1985 | Fleming | 296/97.12 |
| 4,617,699 A | * | 10/1986 | Nakamura | 296/97.9 |
| 4,679,843 A | * | 7/1987 | Spykerman | 296/97.9 |
| 4,707,019 A | * | 11/1987 | Ebert et al. | 296/97.9 |
| 4,785,500 A | * | 11/1988 | Langridge | 296/97.12 |
| 4,919,469 A | * | 4/1990 | Aizawa et al. | 296/97.12 |
| 4,921,300 A | * | 5/1990 | Lawassani et al. | 296/97.12 |
| 5,139,303 A | * | 8/1992 | Miller | 296/97.9 |
| 5,251,949 A | * | 10/1993 | Miller et al. | 296/97.12 |
| 5,338,083 A | * | 8/1994 | Gute | 296/97.9 |
| 5,454,617 A | * | 10/1995 | Welter | 296/97.9 |
| 5,498,056 A | * | 3/1996 | Viertel et al. | 296/97.9 |
| 5,564,772 A | * | 10/1996 | Miller | 296/97.12 |
| 5,871,252 A | * | 2/1999 | Gute | 296/97.9 |
| 5,924,748 A | * | 7/1999 | Zapinski | 296/97.12 |
| 6,059,348 A | * | 5/2000 | Viertel et al. | 296/97.9 |
| 6,598,928 B1 | * | 7/2003 | Drake et al. | 296/97.9 |

FOREIGN PATENT DOCUMENTS

| | | | | | |
|---|---|---|---|---|---|
| JP | 357140222 A | * | 8/1982 | | 296/97.9 |
| JP | 401132419 A | * | 5/1989 | | 296/97.12 |
| JP | 09-315148 | | 12/1997 | | |

* cited by examiner

*Primary Examiner*—Lori L. Coletta
(74) *Attorney, Agent, or Firm*—Arent Fox PLLC

(57) ABSTRACT

In the automobile sun visor of the present invention, a body of the sun visor is placed on a shaft connected to a bracket fitted to a ceiling surface of a cabin of the automobile body in a rotatable manner. A bearing member into which the shaft is inserted is provided on an end portion of the body. On the bearing member, a communicating member coming into contact with a stopper provided on the shaft is provided. A key shaped groove which can pass through the stopper is engaged with the stopper at a place deviating from the rotation range of the body to insert the shaft into the bearing member.

12 Claims, 6 Drawing Sheets

AUTOMOBILE SUN VISOR

BACKGROUND ARTS

The present invention relates to an automobile sun visor in which the sun visor is prevented from being fallen out from the ceiling surface due to an external force.

DESCRIPTION OF THE RELATED ARTS

The conventional automobile sun visor (hereinafter simply referred to as "sun visor") is provided on an upper ceiling surface of the front glass within an cabin and is placed so as to be supported by a shaft to be followed up with the front glass and the front door glass in a rotatable manner (for example, as disclosed in Japanese Patent Laid-Open Publication No. 09-315148).

This sun visor, placed so as to be rotated to follow up with the front glass and with the front door glass, shields sunlight entering from a front side of the automobile and sunlight entering from sides of the automobile.

However, the sun visor having the following problems:

FIG. 8 is an explanatory view showing the state where the conventional sun visor at the seat next to the driver provided on the dashboard is pressed by an airbag.

As shown in FIG. 8, on a lower portion of a sun visor 1 at the seat next to the driver, an airbag 4 provided within a dashboard 3. Upon developing the airbag 4, the airbag 4 presses the sun visor 1 from a lower direction. Also, a lower portion of a sun visor 2 at the driver's seat, an airbag (not shown) is provided within a pad of the steering wheel (not shown). Upon developing the airbag (not shown), the airbag presses the sun visor 2 from a lower direction. When being developed, both airbag 4 and the airbag (not shown) press the sun visors 1 and 2 to diagonally deform the shaft 5. At this time, since a pressing force is loaded to the shaft 5 in an extraction direction, the sun visors 1 and 2 are sometimes fallen out of a vehicle body 6.

FIG. 9 is an explanatory view showing the situation where the conventional sun visor at the driver's side is pressed by a side curtain airbag placed on the ceiling surface.

As shown in FIG. 9, also in the case of a side curtain airbag 7, the sun visor 2 would be similarly fallen out. In the case of the side curtain airbag 7, if the side curtain airbag 7 placed on an upper side of the front door glass is developed when the sun visor 2 is rotated to a side of the front door glass side to shield sunshine, the side curtain airbag 7 pushes the sun visor from a lower side. When being developed, the side curtain airbag 7 presses the sun visor 2 to diagonally deform the shaft 5, whereby sun visor 2 is sometimes fallen out of a vehicle body 6.

The object of the present invention is to provide an automobile sun visor, which can prevent the body of the sun visor being fallen out from the shaft, when the airbag or the side curtain airbag placed within the dashboard and the steering wheel are developed.

SUMMARY OF THE INVENTION

The automobile sun visor according to the present invention is an automobile sun visor having a body of the sun visor rotably provided on a shaft connected to a bracket fitted to a ceiling of an automobile cabin; a bearing member, into which said shaft is inserted, being provided on an end portion of the body of the sun visor; a communicating member, which is come into contact with a stopper placed on said shaft, being provided on said bearing member; and a portion for inserting the stopper for said communicating member being engaged with said stopper at a place deviating from the rotation range of said body of the sun visor to insert said shaft into said bearing member.

According to the present invention, which has a stopper provided on the shaft, even if the front side type airbag or side curtain airbag placed within the dashboard, the steering wheel or such is developed to apply a load in the direction of the shaft being fallen out (extraction direction), the stopper can be engaged with the communicating member to prevent the sun visor from being fallen out from the surface of the ceiling of the automobile body.

Since the bearing member is engaged with the stopper at a place deviating from the rotation range of the body of the sun visor to insert the shaft into the bearing member, it is possible to prevent the body of the sun visor being fallen out from the automobile body within the rotation range the sun visor, which is usually utilized.

BRIEF DESCRIPTION OF THE DRAWINGS

FIG. 6 is a drawing showing an automobile sun visor according to the present invention, wherein

DESCRIPTION OF THE PREFERRED EMBODIMENTS

Figure 1:
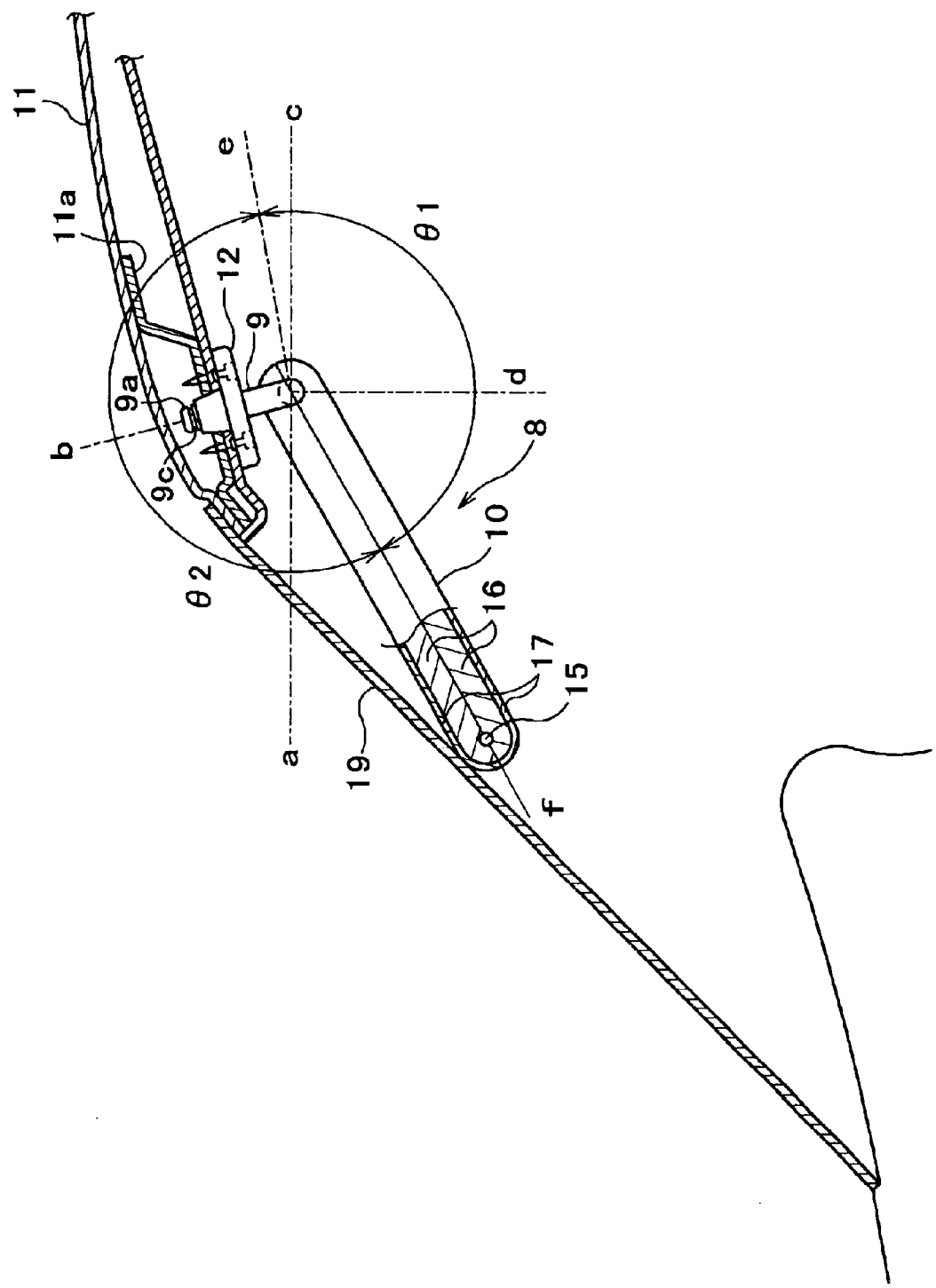
FIG. 1 is a drawing showing an automobile sun visor according to the present invention, which is an explanatory view showing the situation of placing the sun visor.

Referring to the drawings, the automobile sun visor according to the present invention will now be described in detail.

In the automobile sun visor according to this embodiment, there is a sun visor for a left side provided on a surface of the ceiling at the side of the seat next to the driver and a sun visor for a right side provided on a surface of the ceiling a the driver's side, and both sun visors have shapes symmetrical with each other. In this embodiment, the sun visor for a left side is exemplified for the description.

As shown in FIG. 1, a sun visor 8 possesses a bracket 12 fixed on an automobile body 11, a shaft 9 fitted to the bracket 12, a bearing member 13 rotatably supported by the shaft 9, a communicating member 14, which is communicated with the bearing member 13 in order to maintain the rotation angle of the sun visor relative to the shaft, and the body 11 of the sun visor fitted to the bearing member 13.

Figure 5:
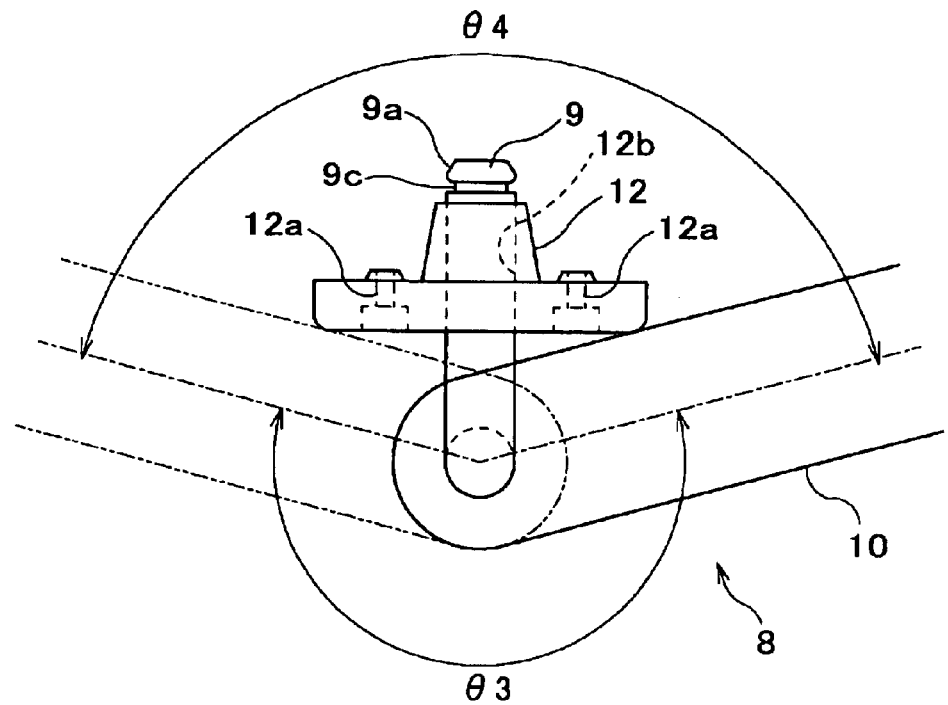
FIG. 5 is a drawing showing an automobile sun visor according to the present invention, which is an enlarged perspective view of the main portion showing the configuration of the bearing portion.

As shown in FIG. 5, the bracket is a metal fitting, which rotatably supports an end portion 9a of the shaft 9 at the side of being placed on the automobile body and fits the shaft 9 to a ceiling surface 11a of the automobile body. The bracket 12 has a plurality of screw holes 12a for screwing the bracket 12 on the automobile body 11 and a shaft hole 12b for piercing the shaft pierced therethrough.

Figure 3:
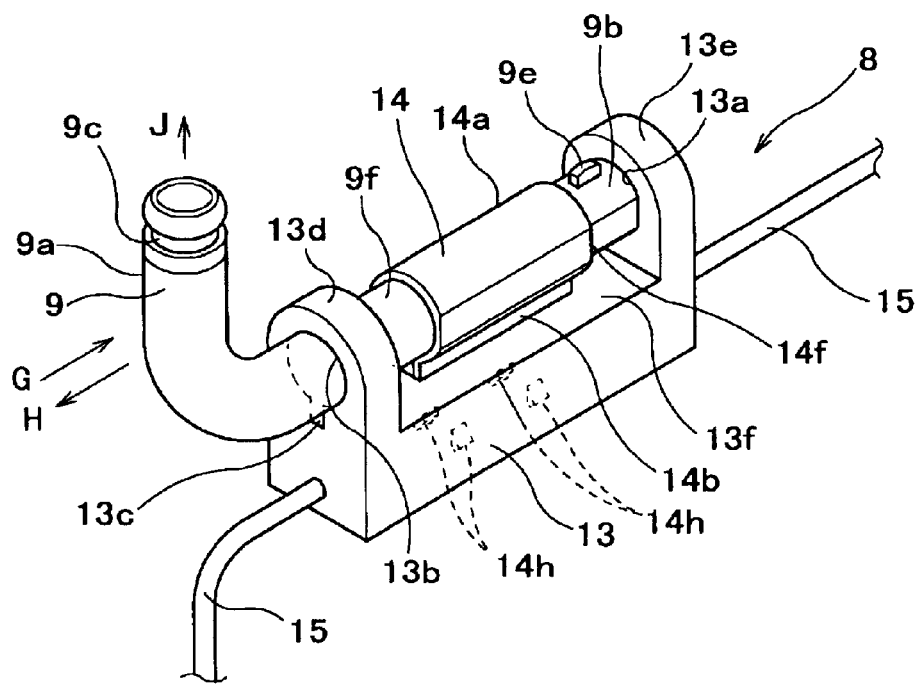
FIG. 3 is a drawing showing an automobile sun visor according to the present invention, which is an enlarged perspective view of the main portion showing the configuration of the bearing portion.
Figure 4:
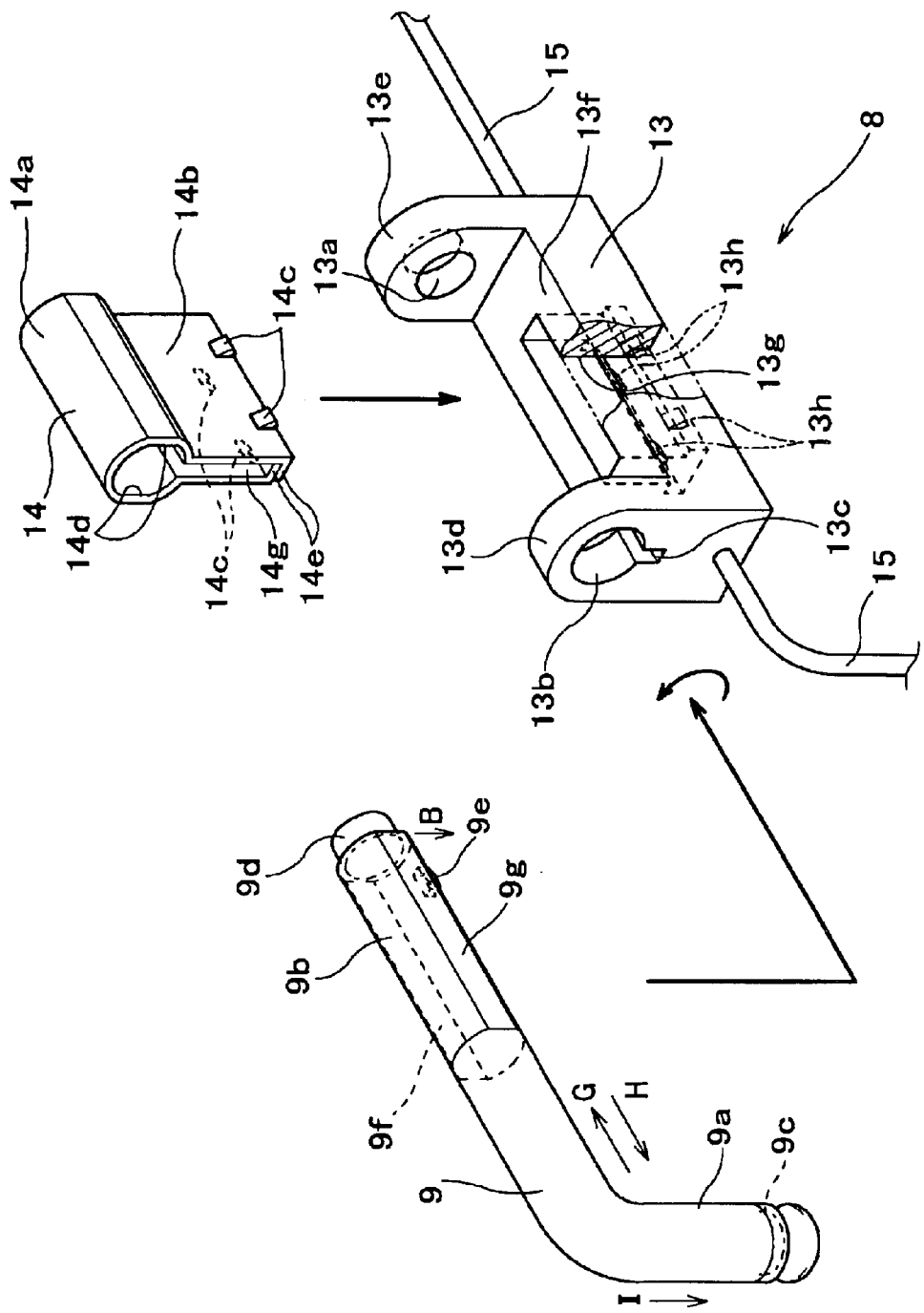
FIG. 4 is a drawing showing an automobile sun visor according to the present invention, which is an enlarged perspective view of the main portion showing the configuration of the bearing portion.

As shown in FIG. 3 and FIG. 4, the shaft 9 is a shaft rod made of a meal having an elbow shape which is bent at substantially a right angle. The shaft 9 inserts the bracket 12 into the end portion 9a of the shaft 9 at the side placed on the automobile body, and inserts the bearing member 13 and the communicating member 14 in another end portion 9b. On the end portion 9a of the shaft 9 at the side placed on the automobile body, a circular groove 9c for placing a coil spring (not shown) and a fitting (not shown) for a coil spring is formed. On the end portion 9b of the shaft 9, a portion 9d with a small diameter to be inserted into a hole 13a for supporting a shaft of the bearing member 13, a portion 9f with a large diameter formed at a central side of the portion 9d with a small diameter, a stopper 9e having a key shape provided on the portion 9f with a large diameter near the portion 9d with a small diameter, and a flat communicating surface 9g which is communicated with a surface 14d for preventing rotation of a communicating piece are formed.

As shown in FIG. 1, the shaft 9 is placed in the state where the end portion 9a at the side placed on the automobile body is directed toward the ceiling surface 11a, and as shown in FIG. 3, the stopper 9e is placed at the position where it is directed towards the ceiling surface 11a. The stopper 9e comprises a projection unified with the shaft 9 by welding, pressing or such.

Figure 6A:
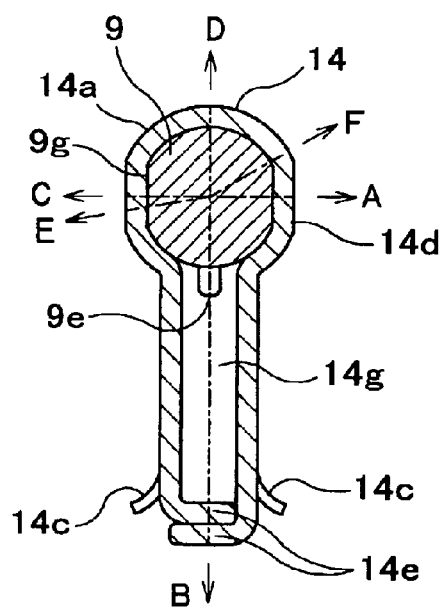
FIG. 6A is an explanatory view showing the direction of the stopper when the shaft is assembled with the communicating member.
Figure 6B:
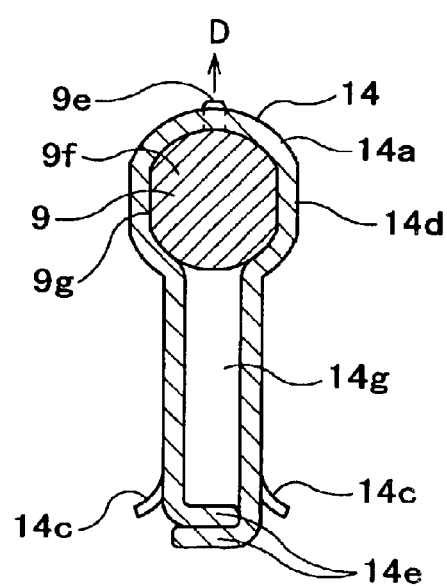
FIG. 6B is an explanatory view showing the direction of the stopper when the sun visor provided on the automobile body is utilized.

FIG. 6 is a drawing showing an automobile sun visor according to the present invention, wherein FIG. 6A is an explanatory view showing the direction of the stopper when the shaft is assembled with the communicating member, and FIG. 6B is an explanatory view showing the direction of the stopper when the sun visor provided on the automobile body is utilized.

As shown in FIG. 4 and FIG. 6A, when the shaft 9 is inserted into the bearing member 13, the end portion 9a at the side placed on the automobile body and the stopper 9e are directed downwardly, the stopper 9e is inserted into a key-shaped groove 13c formed on a lower side within a through hole 13b for a shaft and a stopper inserting portion 14g on a lower side of a cylindrical portion 14a of the communicating member 14 is inserted to insert the portion 9b with a small diameter into the hole 13a for supporting a shaft.

As shown in FIG. 4, the bearing member 13, which is a resin molded article, has a pair of bearings 13d and 13e for inserting the shaft 9, and a cutaway portion 13f is formed between the pair of the bearings 13d and 13e. The through hole 13b for a shaft in which a portion 9f with a large diameter of the shaft 9 is inserted is pierced through the bearing 13d, and the hole 13a for supporting a shaft in which the portion 9d with a small diameter of the shaft 9 is inserted is pierced through the bearing 13e. The key-shaped groove 13c formed on a lower side within the through hole 13b for a shaft to prevent the shaft from being fallen out.

At lower portion within the cutaway portion 13, a circular frame 15 made of a metal wire is insert-molded with a synthetic resin. A through hole 13g in which a fitting piece 14b of the communicating member 14 is inserted is pierced through the bottom surface of the cutaway portion 13f directed toward the body 10 of the sun visor. The length of the through hole 13g in direction of the hole 13a for supporting and that in the direction of the through hole 13b for a shaft are substantially the same as the length of the cylindrical portion 14a of the communicating member 14 in the direction of the hole so as to be maintained not to move communicating member 14 having been inserted into the through hole 13g toward the direction of the hole. A communicating groove 13h for communication with the communicating piece 14c formed on a lower end portion of the fitting piece 14b is formed on an opening end of through hole 13g at the side of the body 10 of the sun visor.

The communicating member 14 is a member for preventing the deletion which maintain the shaft 9 on the bearing member 13 by elastically supporting the shaft 9 having being inserted into the cylindrical portion 14a on the through hole 13g. The communicating member 14 is mainly composed of a cylindrical portion 14a having a substantially C shape, which is placed on the same axis as the axis of the hole 13a for supporting a shaft and the through hole 13b for a shaft of the bearing member 13 and the fitting piece 14b hanging down from both ends at a lower portion of the cylindrical portion 14a. The communicating member 14 is formed by pressing a rectangular plate spring made of a metal into a substantially U shape.

The fitting piece 14b has elasticity compressively coming into contact with an inner wall of the through hole 13g of the bearing member 14, and by pressing the plurality of communicating pieces 14c formed on a lower portion to the communicating groove 13h through this elasticity, the communicating member 14 is fitted to the bearing member 13. Both ends of the communicating piece 14c are bent in an L-shape, respectively to form a piece 14e for preventing the extraction so that the communicating piece 14c is not bent toward the direction separated from the fitting piece 14c to a predetermined level or more. Between two fitting pieces 14b, a stopper inserting portion 14g comprising a space which can pierces the shaft by pushing the stopper 9e of the shaft 9 having been inserted into the cylindrical portion 14a is provided.

Figure 2:
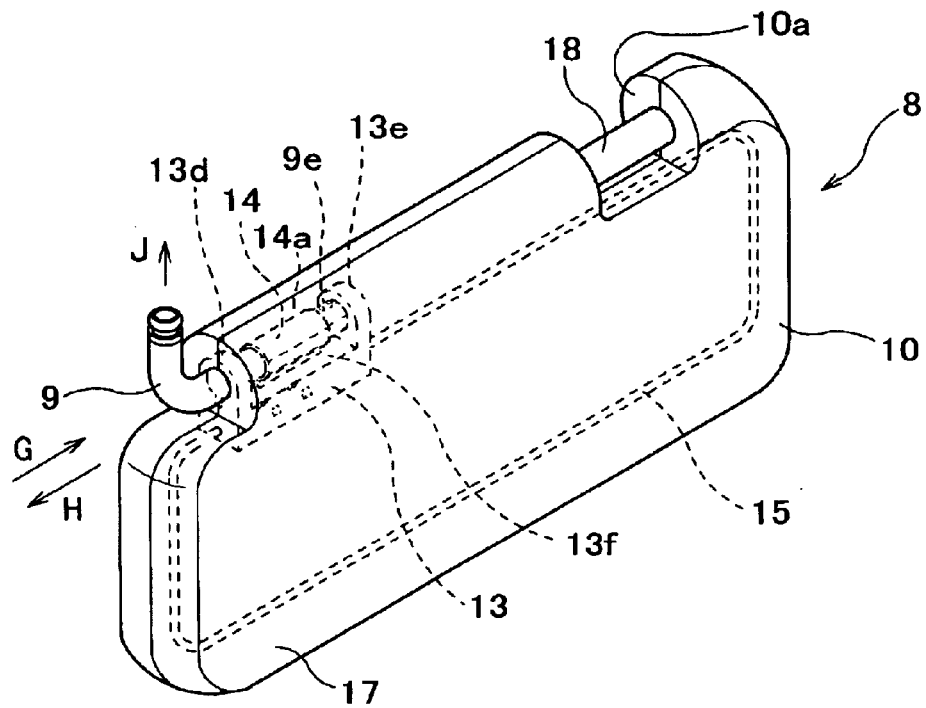
FIG. 2 is a drawing showing an automobile sun visor according to the present invention, which is a perspective view of the sun visor.

As shown in FIG. 1, the body 10 of the sun visor is mainly composed of a cushion body 16 comprising front and rear half bodies of the cushion connected with each other having a cushioning property such as polyurethane foam, an external skin 17 which covers the cushion body 16, and the wire-form frame 15 which is inwardly packed around the cushion body 16. Furthermore, as shown in FIG. 2, a supporting rod 18 is a member for supporting the body 10 of the sun visor to the front side and the rear side of the crew by the communication with a front glass (see FIG. 1) and with a C-shaped communication portion (not shown) provided on the ceiling surface 11 of the automobile body 6 on the front door glass. Both ends of the supporting rod 18 are fixed within a concave portion 10a formed on the body 10 of the sun visor. The end portion 9a of the shaft 9a may extent to thereby be unified with the supporting rod 18.

The operation of the automobile sun visor according to the present invention will now be described.

First, as shown in FIG. 4, fitting pieces 14b at the right and left sides of the communicating member 14 are pushed together whereby the fitting pieces 14b are inserted against the elastic force of the fitting piece 14b into the through hole 13g of the bearing member 13 in which the frame 15 is unified. For the while, the communicating piece 14c at the end portion of the fitting piece 14b is inserted into the communicating groove 13h to fit the communicating member 14 to the bearing member 13.

Subsequently, the stopper 9e of the end portion 9b of the shaft 9 is inserted into the through hole 13b for a shaft to meet the key-shaped groove 13c of the bearing member 13. Furthermore, the shaft 9 is pushed in to thereby insert the stopper 9e into the stopper inserting portion 14g between the fitting pieces 14b at the left and right sides and to insert the portion 9d with a small diameter into the hole 13a for supporting a shaft.

As described above, the shaft 9 is fitted to the bearing member 13. As shown in FIG. 6A, when the shaft 9 is inserted into the bearing member 13, the stopper 9e is engaged with and inserted into the stopper inserting portion 14g. At this time, the flat communicating surface 9g of the shaft 9 is engaged with the flat surface 14d for preventing the rotation of a communicating piece and, thus, the shaft 9 can easily be pierced without undergoing any elastic force of the cylindrical portion 14a.

Figure 7:
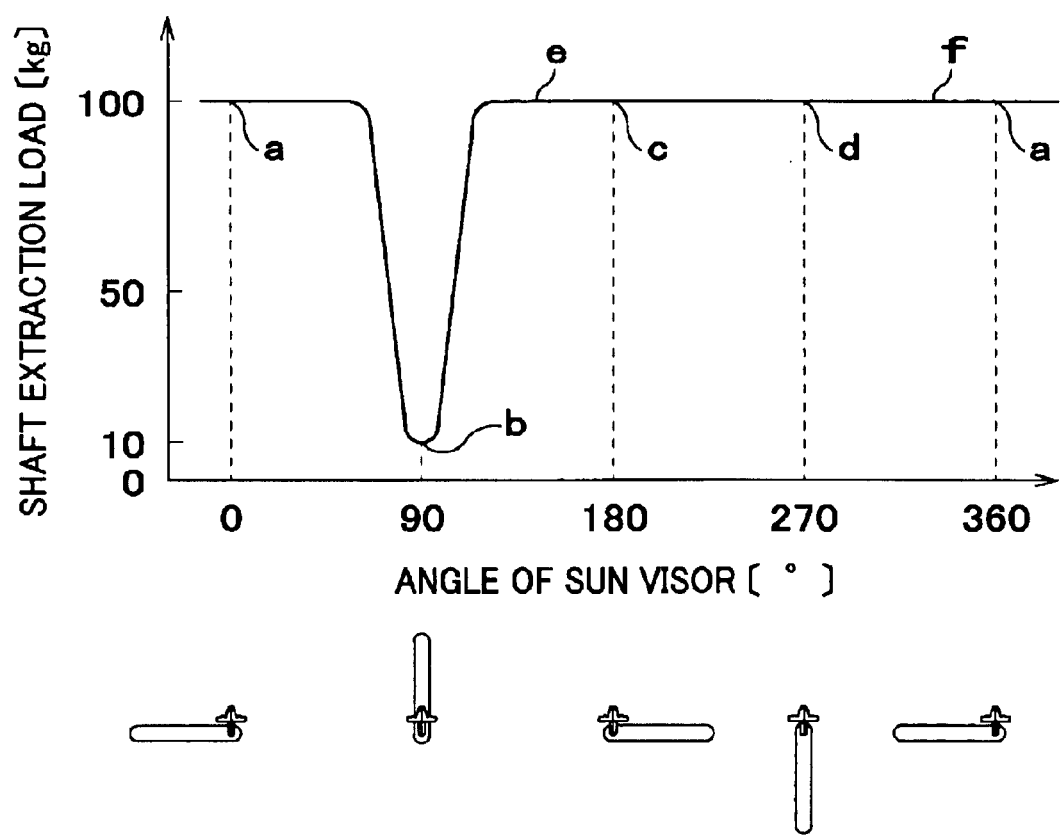
FIG. 7 is a graph showing an automobile sun visor according to the present invention, which shows a relation between the angle of the sun visor and the load of pulling out the shaft.
Figure 8:
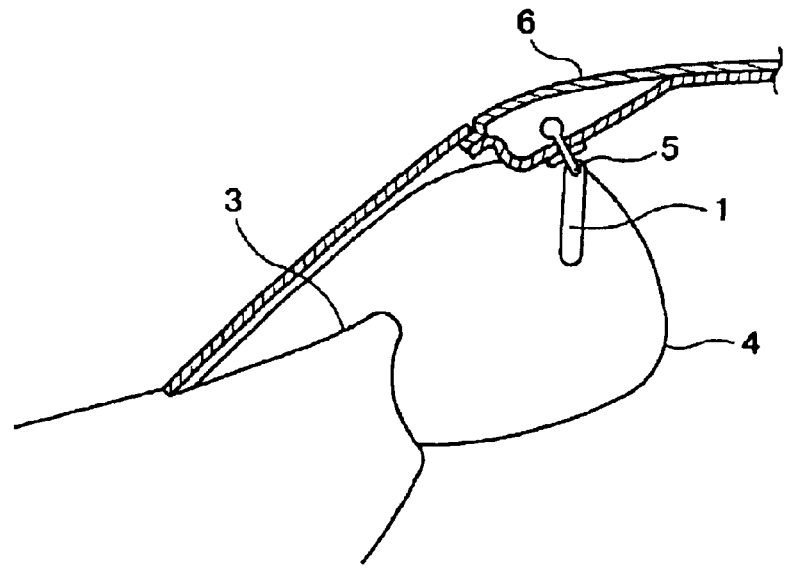
FIG. 8 is an explanatory view showing the situation where the conventional sun visor at the side of the seat next to the driver is pushed by the airbag provided within the dashboard.
Figure 9:
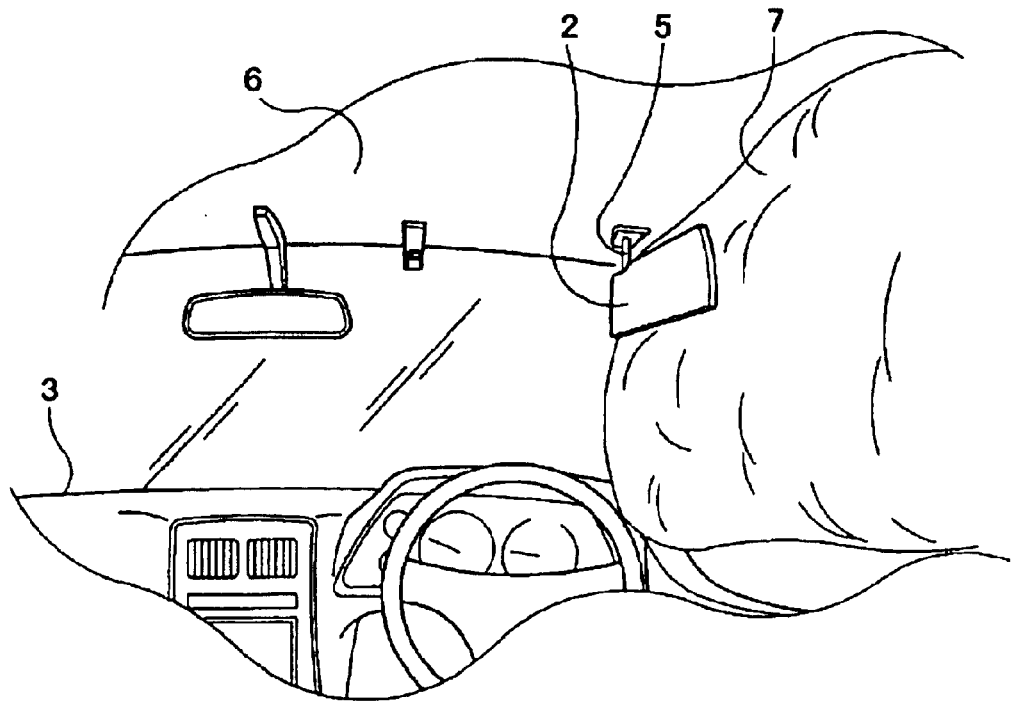
FIG. 9 is an explanatory view showing the situation where the conventional sun visor at the driver's side of is pushed by the side curtain airbag provided on the surface of the ceiling.

FIG. 7 is a graph showing an automobile sun visor according to the present invention, which shows a relation between the angle of the sun visor and the load of pulling out the shaft.

When the position of the stopper 9e is engaged with the position of the stopper inserting portion 14g, the load (kg) which attaches or detaches the shaft by pushing the shaft in the direction of the insertion into the bearing member 13 (arrow G) and by extracting the shaft in the direction of the extraction of the shaft (arrow H), is about 10 kg at point b, which will be described later on, as shown in FIG. 7, and the shaft can easily be attached and detached. As shown in FIG. 4, at this time, the end portion 9a placed at the automobile body is directed toward the ground position (arrow I).

When the shaft 9 is rotated from the state where the stopper 9e is directed toward the ground side as shown as arrow B in FIG. 6A to horizontal shift its position to pull the shaft 9 in the direction of the extraction (arrow H), the stopper 9e is come into contact with the opening end 14f at the side of the bearing 13e of the cylindrical portion 14a, and the shaft cannot be fallen out, unless the communicating member 14 is deformed.

The load (kg) for extracting the shaft 9 in the extraction direction (arrow H) at this time is approximately 100 kg at point a, point c and point d as described fully later on, and, this, the communicating member 14 is never broken unless the shaft 9 is fallen out at, such a degree of load. Consequently, the shaft 9 cannot be fallen out from the bearing member 13.

As described above, at the time of assembling the sun visor 8, the shaft 9 is never fallen out from the bearing member 13, unless the end portion 9a placed at the automobile body is directed towards the ground (arrow I) and the stopper is also directed towards the ground (arrow B), and the sun visor 8 can easily be fitted.

Two cushion bodies 19 are engaged with both sides of the bearing member 13 and the frame 15 thus assembled, and are conjugated with each other by an adhesive or such, and are covered with the external skin 17.

Subsequently, the end of the shaft 9 is directed towards the ceiling surface 11a, and the bracket 12 placed at the end portion 9a of the shaft 9 at the side placed on the automobile body is screwed on the ceiling surface 11a of the automobile body 11, whereby the sun visor 8 can be fitted to the automobile body 11 in a rotatable manner.

When the sun visor 8 is provided on the automobile body 11, the end portion 9a of the shaft 9 at the side placed on the automobile body, and the stopper 9e of the shaft 9 are always directed towards the direction of the ceiling surface 11a (arrow J), and the body 10 of the sun visor is rotated to the side of the front glass 19 and to the side of the front door glass side around the axis of the portion 9a of the shaft 9 at the side of being placed on the automobile body, which becomes the lengthwise rotation axis of the sun visor 8, as a center.

As shown in FIG. 1, for example, taking the angle of the body 10 the sun visor directed when the body 10 of the sun visor is directed towards the front direction of the automobile body 11 as a standard angle (0°), the stopper 9e is directed towards the direction shown as arrow A in FIG. 6A and positioned at which it is come into contact with the opening end 14f of the cylindrical portion 14a. For this reason, when the body 10 of the sun visor resides at the standard angel a (0)°, the extraction load is approximately 100 kg as shown as point a in FIG. 7, making it possible to prevent the body 10 of the sun visor from being fallen out.

Since there is the front glass at the position of the angle where the body 10 of the sun visor is directed being the standard angel a (0)°, the body 10 of the sun visor cannot be rotated to the direction of the standard angel in a practical manner.

For example, when the body 10 of the sun visor is directed toward a direction of the angle b (approximately 90)° in an upper direction, the stopper 9e is directed toward arrow B in FIG. 6A, and two fitting pieces 14b are positioned within the stopper inserting portion 14g. For this reason, when the body 10 of the sun visor is directed toward the angle b (approximately 90)°, the extraction load is approximately 10 kg as shown in FIG. 7 as point b, the body 10 of the sun visor can easily be extracted.

Since there is the ceiling surface 11a of the automobile body in the position where the body 10 of the sun visor is directed toward the angle b (approximately 90)°, the body 10 of the sun visor cannot be rotated to the direction of the angle b (approximately 90)°, in a practical manner.

Specifically, for detaching the body 10 of the sun visor from the automobile body, the body 10 of the sun visor cannot be detached unless the bracket 12 having been screwed is taken out.

When the sun visor 8 is not used, as shown in FIG. 1 the body 10 of the sun visor is positioned at a storage position where the body 10 of the sun visor is rotated to the angel e (approximately 170) °, following the ceiling surface 11a of the cabin.

At this time, the stopper 9e is directed toward the direction shown by arrow E in FIG. 6A, and is positioned where it is come into contact with the opening end 14 of the cylindrical portion 14. For this reason, since the body 10 of the sun visor resides at the standard angle a (0)°, the extraction load is approximately 100 kg as shown by point a in FIG. 7 and, thus, the body 10 of the sun visor can be prevented form being fallen out.

Specifically, for detaching the shaft 9 from the body 10 of the sun visor, the shaft 9 cannot be extracted unless approximately 100 kg load is applied to whereby the stopper 9e deforms or break the cylindrical portion 14a and bearing 13d.

The angle ..1 from this storage position to the point f where the body 10 of the sun visor is come into contact with the front glass is the practically existing rotation range of the sun visor 8 fitted to the automobile body. At the position c in a rear direction of the automobile body, the position d in the ground direction, and point f where the body 10 of the sun visor is come into contact with the front glass within the angle ..1, which is the rotation range of the sun visor 8, the stopper 9e is directed toward the direction shown as arrows C, D, and F in FIG. 6A, respectively, and is posited at which the stopper 9e is come into contact with the opening end 14f of the cylindrical portion 14a. For this reason, when the sun visor 8 is positioned within the angle ..1 which is the rotatable range of the sun visor 8, the extraction load is approximately 100 kg as shown as point e, c, d, and f in FIG. 7 and, thus, the sun visor 8 can be prevented from being fallen out through an external force.

Specifically, for detaching the shaft 9 from the body 10 of the sun visor, the shaft 9 cannot be extracted unless approximately 100 kg load is applied to whereby the stopper 9e deforms or break the cylindrical portion 14 and the bearing 13d.

When the sun visor 8 is positioned at the storage position where the sun visor 8 is not used, the shaft 9 is tightly held to the bearing member 13 by means of the stopper 9e. Consequently, even if the airbag is developed or any other external force is loaded onto the sun visor 8, the body 10 of the sun visor is never fallen out from the shaft 9 provided on the automobile body 11.

As shown in FIG. 1, the angle where the body 10 of the sun visor fitted to the automobile body is rotated is the angle ..2, from the ceiling surface 11a to the front glass 19 within the cabin. Since the automobile body 11 and the front glass obstruct the rotation within the angle ..2, the body 10 of the sun visor cannot be rotated within the angle ..2.

Specifically, in order to direct the stopper 9e toward the ground direction (arrow B) in FIG. 6A, which is the direction where the shaft 9 can easily fallen out, and in order to position the body 10 of the sun visor directed toward the upper position (b direction) shown in FIG. 1, there is only one way that the screws are removed to remove the bracket 12 out of the ceiling surface 11a.

As shown in FIG. 1, when the body 10 of the sun visor is positioned at a light trapping position along with the front glass 19, the body 10 of the sun visor is rotated around the end portion 9b, which is the traverse axis of the shaft 9 as a center. The direction of the body 10 of the sun visor rotated at a respective position is elastically held by coming the stopper inserting portion 14g into contact with the communicating surface 9g and, thus, the body 10 of the sun visor is not rotated through vibration of the automobile body or such.

It should be noted that the present invention can be altered or modified within the sprits and the technical idea of the present invention, and these alternations and modifications of the present invention are also within the scope of the present invention.

The position of providing the stopper 9e placed on the shaft 9 is not limited to be the ground direction (the direction of arrow B) as shown in FIG. 6A and the position of the body 10 of the sun visor is not limited to the direction toward the upper direction (b) as shown in FIG. 1. For example, the stopper 9e may be positioned so that it is inserted into the stopper inserting portion 14g between two fitting pieces 14b only when the body 10 of the sun visor is interfered with the front glass 19.

For example, it is possible that the stopper 9e of the shaft 9 is inserted between two fitting pieces 14b when the body 10 of the sun visor is interfered with the front glass 19 so as to extract the shaft only by a weak force.

The configuration of the sub visor is also not restricted to the embodiments described above. For example, as shown in FIG. 5, it may be configured that the rotatable angle ..3 of the body 10 of the sun visor may be controlled by the bracket 12, and the stopper 9e is placed at the position where it is inserted between two fitting pieces 14b when the sun visor exists within the rotatable angle ..3.

What is claimed is:

1. An automobile sun visor having a body of the sun visor rotatably provided on a shaft connected to a bracket fitted to a ceiling of an automobile cabin;
    a bearing member, into which said shaft is inserted, being provided on an end of the body of the sun visor;
    a communicating member, which is come into contact with a stopper placed on said shaft, being provided on said bearing member; and
    a portion for inserting the stopper for said communicating member being engaged with said stopper at a place deviating from the rotation range of said body of the sun visor to insert said shaft into said bearing member.

2. An automobile sun visor having a body of the sun visor rotatably provided on a shaft connected to a bracket fitted to a ceiling of an automobile cabin;
    a bearing member, into which said shaft is inserted, being provided on an end of the body of the sun visor;
    a communicating member, which is come into contact with a stopper placed on said shaft, being provided on said bearing member; and
    a portion for inserting the stopper for said communicating member being engaged with said stopper at a place deviating from the rotation range of said body of the sun visor to insert said shaft into said bearing member, wherein a circular groove for placing a coil spring and a fitting for a coil spring is formed on the end portion of said shaft at the side placed on the automobile body.

3. The automobile sun visor according to claim 2, wherein a portion with a small diameter to be inserted into a hole for supporting a shaft of the bearing member, a portion with a large diameter formed at a central side of the portion with a small diameter, a stopper having a key shape provided on the portion with a large diameter near the portion with a small diameter, and a flat communicating surface which is communicated with a surface for preventing rotation of a communicating piece is formed on the end portion of the shaft other than the end portion of said shaft at the side placed on the automobile body.

4. An automobile sun visor having a body of the sun visor rotatably provided on a shaft connected to a bracket fitted to a ceiling of an automobile cabin;
    a bearing member, into which said shaft is inserted, being provided on an end of the body of the sun visor;
    a communicating member, which is come into contact with a stopper placed on said shaft, being provided on said bearing member; and
    a portion for inserting the stopper for said communicating member being engaged with said stopper at a place deviating from the practical rotation range of said body of the sun visor, to insert said shaft into said bearing member, wherein said shaft is placed in the state where the end portion at the side placed on the automobile body is directed toward the ceiling surface, and the stopper is placed at the position where it is directed towards the ceiling surface.

5. The automobile sun visor according to claim 1, wherein said bearing member has a pair of bearings and for inserting the shaft, and a cutaway portion is formed between the pair of said bearings.

6. The automobile sun visor according to claim 5, wherein a through hole for a the shaft in which a portion with a large diameter of the shaft is inserted is pierced through the bearing, and the hole for supporting the shaft in which the portion with a small diameter of the shaft is inserted is pierced through the bearing, and a key-shaped groove formed on a lower side within the through hole for a the shaft to prevent the shaft from being fallen out.

7. An automobile sun visor having a body of the sun visor rotatably provided on a shaft connected to a bracket fitted to a ceiling of an automobile cabin;

a bearing member, into which said shaft is inserted, being provided on an end of the body of the sun visor;

a communicating member, which is come into contact with a stopper placed on said shaft, being provided on said bearing member; and a portion for inserting the stopper for said communicating member being engaged with said stopper at a place deviating from the rotation range of said body of the sun visor to insert said shaft into said bearing member, wherein a through hole for the shaft in which a portion with a large diameter of the shaft is inserted is pierced through the bearing, and the hole for supporting the shaft in which the portion with a small diameter of the shaft is inserted is pierced through the bearing, and a key-shaped groove formed on a lower side within the through hole for the shaft to prevent the shaft from being fallen out, and wherein a communicating groove for communication with the communicating piece formed on a lower end portion of the fitting piece is formed on an opening end of through hole at the side of the body of the sun visor.

8. The automobile sun visor according to claim 1, wherein said communicating member is mainly composed of a cylindrical portion having a substantially C shape, and fitting piece hanging down from both ends at a lower portion of said cylindrical portion.

9. An automobile sun visor having a body of the sun visor rotatably provided on a shaft connected to a bracket fitted to a ceiling of an automobile cabin;

a bearing member, into which said shaft is inserted, being provided on an end of the body of the sun visor;

a communicating member, which is come into contact with a stopper placed on said shaft, being provided on said bearing member; and a portion for inserting the stopper for said communicating member being engaged with said stopper at a place deviating from the rotation range of said body of the sun visor to insert said shaft into said bearing member, wherein the position of providing the stopper placed on the shaft is the ground direction, and the position of the body of the sun visor is the direction toward the upper direction.

10. An automobile sun visor having a body of the sun visor rotatably provided on a shaft connected to a bracket fitted to a ceiling of an automobile cabin;

a bearing member, into which said shaft is inserted, being provided on an end of the body of the sun visor;

a communicating member, which is come into contact with a stopper placed on said shaft, being provided on said bearing member; and a portion for inserting the stopper for said communicating member being engaged with said stopper at a place deviating from the rotation range of said body of the sun visor to insert said shaft into said bearing member, wherein said stopper is positioned so that it is inserted into the stopper inserting portion between two fitting pieces only when the body of the sun visor is interfered with the front glass.

11. An automobile sun visor having a body rotatably provided on a shaft connected to a bracket fitted to a ceiling of an automobile cabin, comprising:

a bearing member, into which said shaft is inserted, being provided on an end of the body of the sun visor;

a communicating member, which makes contact with a stopper placed on said shaft, being provided on said bearing member; and a stopper inserting portion in said communicating member for allowing said shaft to be inserted into said bearing member, wherein, for the entire operational rotation range of the body of the sun visor, the stopper and the stopper inserting portion are radially separated.

12. An automobile sun visor having a body of the sun visor rotatably provided on a shaft connected to a bracket fitted to a ceiling of an automobile cabin;

a bearing member, into which said shaft is inserted, being provided on an end of the body of the sun visor;

a communicating member, which is come into contact with a stopper placed on said shaft, being provided on said bearing member; and a portion for inserting the stopper, to insert said shaft into said bearing member, wherein a position of the stopper when the shaft is inserted deviates from a position of the stopper when the body of the sun visor is within the operational rotation range of the body of the sun visor.

* * * * *